US010858607B2

United States Patent
Scalzo et al.

(10) Patent No.: US 10,858,607 B2
(45) Date of Patent: Dec. 8, 2020

(54) PROCESS FOR BENEFICIATING AND CLEANING BIOMASS

(71) Applicant: Active Energy Group Plc, London (GB)

(72) Inventors: Philip J. Scalzo, South Jordan, UT (US); Carleton D. Tait, Bountiful, UT (US); Ronald A. Cella, Centerville, UT (US)

(73) Assignee: Active Energy Group PLC, London (GB)

( * ) Notice: Subject to any disclaimer, the term of this patent is extended or adjusted under 35 U.S.C. 154(b) by 0 days.

(21) Appl. No.: 15/877,937

(22) Filed: Jan. 23, 2018

(65) Prior Publication Data

US 2018/0334629 A1 Nov. 22, 2018

Related U.S. Application Data

(60) Provisional application No. 62/508,043, filed on May 18, 2017.

(51) Int. Cl.
*C10L 5/44* (2006.01)
*B01J 3/04* (2006.01)
(Continued)

(52) U.S. Cl.
CPC .............. *C10L 5/442* (2013.01); *B01J 3/04* (2013.01); *C10L 5/363* (2013.01); *C10L 5/445* (2013.01);
(Continued)

(58) Field of Classification Search
CPC combination set(s) only.
See application file for complete search history.

(56) References Cited

U.S. PATENT DOCUMENTS

| 4,398,917 A | 8/1983 | Reilly |
| 7,544,635 B2 | 6/2009 | Liang et al. |

(Continued)

FOREIGN PATENT DOCUMENTS

| EP | 1316620 | 6/2003 |
| EP | 2838981 | 2/2015 |
| WO | WO 2015/195440 A1 | 12/2015 |

OTHER PUBLICATIONS

Ramos, Luiz P. , "The chemistry involved in the steam treatment of lignocellulosic materials", Quí mica Nova, 2003.

(Continued)

*Primary Examiner* — Ellen M McAvoy
*Assistant Examiner* — Ming Cheung Po
(74) *Attorney, Agent, or Firm* — Durham Jones & Pinegar; Sarah W. Matthews

(57) ABSTRACT

A process for cleaning and beneficiating biomass is described which may allow removal of entrained salts and light volatiles from biomass materials. The process may also minimize energy use through capturing steam and flue gases for re-use. The process may generally comprise the following steps: prewashing and/or preheating a biomass, pressurizing the biomass in a steam explosion vessel, rapidly depressurizing the steam explosion vessel, releasing the steam from the steam explosion vessel entrained with fine lignin-enriched particles into a cyclone-type gas expansion vessel, routing the steam from the gas expansion vessel to the input hopper, subjecting the biomass to a second washing step, mechanically removing a portion of the water from the biomass, and evaporatively heating the biomass.

37 Claims, 7 Drawing Sheets

(51) Int. Cl.
*C10L 9/08* (2006.01)
*C10L 5/36* (2006.01)
*B01J 8/00* (2006.01)

(52) U.S. Cl.
CPC ............... *C10L 9/08* (2013.01); *B01J 8/0065* (2013.01); *B01J 2208/0084* (2013.01); *B01J 2219/00162* (2013.01); *C10L 2290/02* (2013.01); *C10L 2290/06* (2013.01); *C10L 2290/08* (2013.01); *C10L 2290/30* (2013.01); *C10L 2290/46* (2013.01); *C10L 2290/48* (2013.01); *C10L 2290/50* (2013.01); *C10L 2290/52* (2013.01); *C10L 2290/545* (2013.01); *Y02E 50/10* (2013.01); *Y02E 50/30* (2013.01)

(56) References Cited

U.S. PATENT DOCUMENTS

| | | | |
|---|---|---|---|
| 9,422,481 | B2 | 8/2016 | Van Thorre et al. |
| 9,447,326 | B2 | 9/2016 | Ferraro et al. |
| 9,593,447 | B2 | 3/2017 | Scalzo et al. |
| 9,683,738 | B2 | 6/2017 | Catto et al. |
| 9,701,918 | B2 | 7/2017 | Tait et al. |
| 9,702,548 | B2 | 7/2017 | Scalzo et al. |
| 9,796,940 | B2 | 10/2017 | Tait et al. |
| 10,018,355 | B2 * | 7/2018 | Tait ................. C10L 5/363 |
| 2002/0192774 | A1 | 12/2002 | Ahring et al. |
| 2005/0161038 | A1 | 7/2005 | Pinatti et al. |
| 2008/0045762 | A1 * | 2/2008 | Foody ................. B09B 3/00 585/240 |
| 2010/0037516 | A1 | 2/2010 | Hogsett et al. |
| 2011/0100359 | A1 | 5/2011 | North |
| 2012/0000120 | A1 | 1/2012 | Stark et al. |
| 2012/0028325 | A1 * | 2/2012 | Herring ............ C08B 37/0003 435/165 |
| 2012/0041186 | A1 | 2/2012 | Pschorn et al. |
| 2015/0052805 | A1 | 2/2015 | Catto et al. |
| 2015/0052812 | A1 | 2/2015 | Scalzo et al. |
| 2015/0299579 | A1 | 10/2015 | Van Thorre et al. |
| 2015/0361367 | A1 | 12/2015 | Tait et al. |
| 2015/0361368 | A1 | 12/2015 | Tait et al. |
| 2015/0361369 | A1 | 12/2015 | Tait et al. |
| 2015/0362179 | A1 | 12/2015 | Catto et al. |
| 2015/0362180 | A1 | 12/2015 | Scalzo et al. |
| 2015/0362184 | A1 | 12/2015 | Tait et al. |
| 2015/0362185 | A1 | 12/2015 | Van Thorre et al. |
| 2015/0376530 | A1 | 12/2015 | Brusletto et al. |
| 2016/0010015 | A1 | 1/2016 | Van Thorre et al. |
| 2016/0010016 | A1 | 1/2016 | Catto et al. |
| 2016/0010017 | A1 | 1/2016 | Scalzo et al. |
| 2016/0097157 | A1 | 4/2016 | Scalzo et al. |
| 2016/0298047 | A1 | 10/2016 | Lawrence et al. |
| 2016/0326444 | A1 | 11/2016 | Van Thorre et al. |
| 2017/0121620 | A1 | 5/2017 | Tait et al. |
| 2017/0145331 | A1 | 5/2017 | Scalzo et al. |

OTHER PUBLICATIONS

Shu, H. et al., "Agricultural Waste", Water Environment Research, vol. 87, No. 10, 2015, 1256-1285.
Van Wyk, Jacobus, "Biotechnology and the utilization of biowaste as a resource for bioproduct", Trends in Biotechnology, vol. 19, Issue 5, 172-177.
International Preliminary Report and Patentability from WO2015195440 dated Dec. 20, 2016.
European Search Report, dated Aug. 6, 2018 in related European Application No. EP 18171014.6.
International Search Report and Written Opinion of the International Searching Authority from PCT/IB2018/053501, dated Jun. 8, 2018.
Canadian Patent Office, "First Examiner Report," for Canadian patent application No. CA2999447, dated Oct. 3, 2018.
Canadian Patent Office, "Second Examiner Report," for Canadian patent application No. CA2999447, dated Apr. 3, 2020.
European Patent Office as International Searching Authority, "International Preliminary Report on Patentability", for application No. PCT/IB2018/053501, dated Nov. 19, 2019.

* cited by examiner

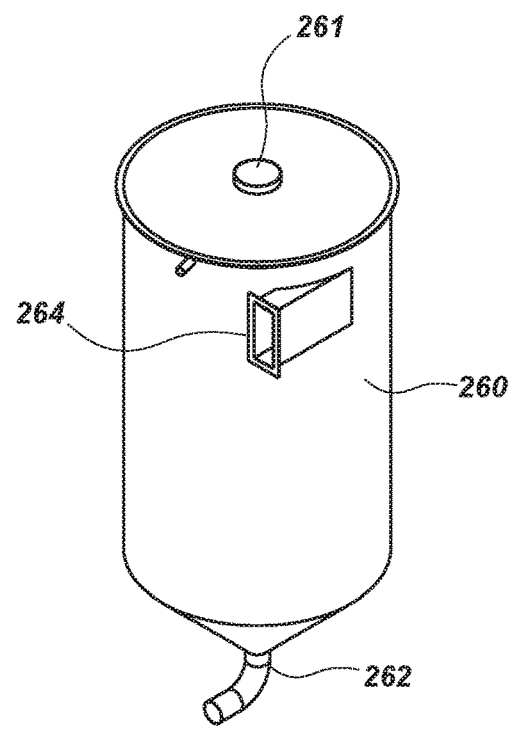
FIG. 6
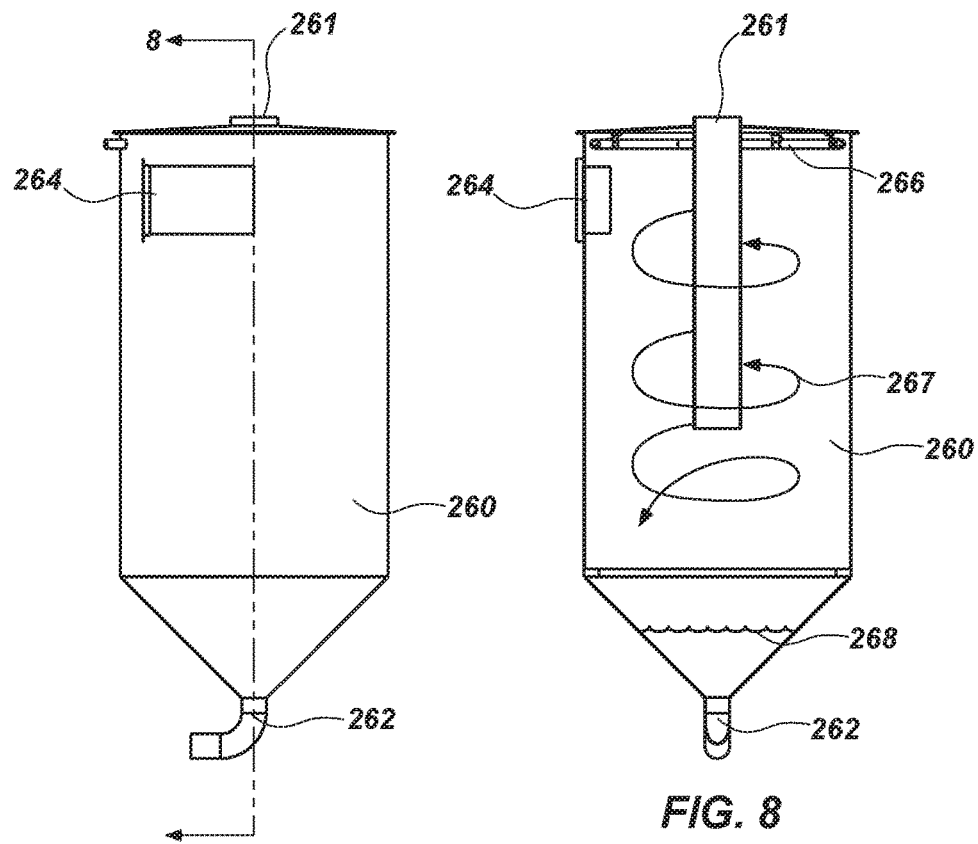
FIG. 7
FIG. 8

PROCESS FOR BENEFICIATING AND CLEANING BIOMASS

TECHNICAL FIELD

This disclosure relates generally to the field of physical and chemical processes for converting biomass into an end product suitable for use as feedstock for solid fuel energy production. More particularly, the disclosure relates to processes for converting biomass which may be built with a modular design and modified to fit particular field requirements.

BACKGROUND

Biomass encompasses a wide array of organic materials including wood, woody waste, agricultural residues, and crops grown specifically for energy production. The U.S. alone generates billions of tons of biomass annually. Beneficiated biomass, in which the moisture content has been reduced and the energy density has been increased, can be used as a feedstock for several products, including pellets for residential heaters, hydrocarbon liquid fuels, cellulosic ethanol, solid fuel to supplant coal, or for production of synthetic natural gas.

Beneficiation is the treatment of raw material to improve physical or chemical properties and typically includes steps to increase the energy density. Conventional methods to beneficiate biomass include heat/steam treatment, torrefication, and pressure extrusion ("densification"). These methods have not been designed necessarily to remove entrained salts and thus do not produce acceptable fuels from many biomass inputs because remaining salts can lead to fouling, slagging, or corrosion when combusted. Consequently, only clean materials such as heartwood can be used as a feedstock, leaving the less expensive "hogged" biomass material as waste. Heat/steam treatment and pressure extrusion methods are also not designed to remove light volatiles from the feedstock, rendering the product potentially unusable as a solid fuel to supplant coal because of premature ignition in the pulverizer or burner. Moreover, these methods are energy intensive, leading to an unfavorable overall energy balance, and thus economically limiting the use of biomass for its intended applications.

Another benefit of beneficiation of raw materials for fuel sources is that it provides a fuel source with a low carbon footprint. The carbon footprint is small due to the way carbon is scored for $CO_2$ greenhouse gas production. Carbon from renewables like wood and wood byproducts are not as significant in contributing to atmospheric $CO_2$ concentrations as carbon from fossil sources like coal because the carbon comes from $CO_2$ which was in the atmosphere to begin with, instead of adding carbon from previously inaccessible sources in the ground.

As an alternative, a re-designed heat/steam treatment of biomass materials with additional cleaning steps can substantially improve the quality of densified biomass while also reducing the amount of required energy. Heat/steam treatment has a variety of descriptions and methods in the literature and centers on biomass drying and energy densification. Most heat/steam systems dry the material early in the process, even before the heat/steam process.

Thus, there is a need for beneficiation methods to further remove entrained salts and light volatiles from biomass materials. It may also be desirable to increase the friability of the material, and minimize energy use through capturing steam and flue gases for re-use.

SUMMARY

The chemical and steam-explosion processes described herein produces a solid biomass-based fuel for use either by itself or blended with another fuel source. According to one aspect of the present disclosure, heat and steam-explosion beneficiation of biomass is described which may produce a renewable solid fuel that has a high energy density (around 8500 to around 10500 BTU/pound, comparable to a sub-bituminous coal), low contaminant (with respect to sulfur and slagging-, fouling-, and corrosion-inducing elements Na, K, and Cl), and a relatively small carbon footprint.

According to another aspect of the present disclosure, the processes described herein may allow otherwise waste biomass, such as non-heart wood scraps or salt-laden wood, to be used for fuel rather than rot in compost piles, thereby preventing release of the potent greenhouse gas methane into the atmosphere.

According to another aspect of the present disclosure, the lignin-enriched content removed from the gas expansion vessel described herein may provide a source for chemical feedstock, sticky binders, non-petrochemical-based polymer replacements, or ultra-high energy density fuel if it is not blended back into the beneficiated biomass removed from the main steam explosion vessel.

According to another aspect, a process is described comprising one or more of the following steps: prewashing and/or preheating a biomass, pressurizing the biomass in a steam explosion vessel or reaction vessel, rapidly depressurizing the reaction vessel, releasing the steam from the reaction vessel entrained with fine, lignin-enriched particles into a cyclone-type gas expansion vessel, routing the steam from the gas expansion vessel to an input hopper, subjecting the biomass to a second washing step, mechanically removing a portion of the water from the biomass, and evaporatively heating the biomass.

According to another aspect, the steam explosion vessel or reaction vessel comprises an inner perforated screen separating the biomass from the main body of the steam explosion vessel and with one or more perforated screen fingers disposed within the steam explosion vessel and positioned within the biomass to increase exposure of the biomass to steam.

According to still another aspect, the steam explosion vessel may have a vertical orientation. In some configurations, the steam explosion vessel may be provided with o-ports, gate valves, and/or autoclaves to seal the top and bottom of the steam explosion vessel. The steam explosion vessel may include a perforated screen liner with one or more screen in/down-comers. The steam explosion vessel may also be provided with a rapidly opening valve such as a fast-opening offset butterfly valve.

According to another aspect, the step of rapidly depressurizing the steam explosion vessel disrupts the biomass structure and releases biomass salts and light volatile organic compounds entrained within the biomass and produces steam containing at least partially lignin-enriched fine particles. The cyclone-type gas expansion and gas-release vessel may be configured to capture the entrained fine lignin-enriched particles.

According to still another aspect, various steps are described to reduce the energy required to complete the process. For example, the step of routing the steam from the gas expansion vessel to the input hopper may recapture heat from the captured steam and steam condensate to heat and wet the biomass in the input hopper. Insulation of the steam explosion vessel and other components may save energy, as well as routing of steam and use of heat from flue gas to improve energy balance of plant.

According to yet another aspect, the disrupted biomass may be subjected to a second washing step to remove additional salts and light volatile organic compounds derived from the disrupted biomass. This second washing step may be done in a separate wash tank or washing apparatus. In some configurations, the entrained fine lignin-enriched particles captured in the gas expansion vessel may be added to the biomass in the second washing step. In other configurations, they may be added at a later step or not added and used for a separate purpose.

According to another aspect, mechanically removing a portion of water from the biomass may be accomplished with extrusion water removal steps, wherein the resulting biomass comprises less than about 50% water by weight and wherein additional salts and light organic compounds derived from the disrupted biomass are removed with the water.

In some configurations, mechanically removing a portion of water from the biomass may be accomplished through use of one or more of a screw press, roller press, torque/grinder presses, etc.

According to another aspect, the biomass may be evaporatively heated to remove an additional portion of the water and produce a friable biomass, wherein the resulting friable biomass comprises less than about 25% water by weight.

BRIEF DESCRIPTION OF THE DRAWINGS

Various embodiments and aspects of the present disclosure are shown and described in reference to the numbered drawings wherein:

FIG. 6 shows a perspective view of an exemplary gas expansion vessel;

FIG. 7 shows a side view of the gas expansion vessel of FIG. 6;

FIG. 8 shows a cross-section view of the expansion vessel of FIGS. 6 and 7, taken along line 8-8 of FIG. 7;

Figure 1:
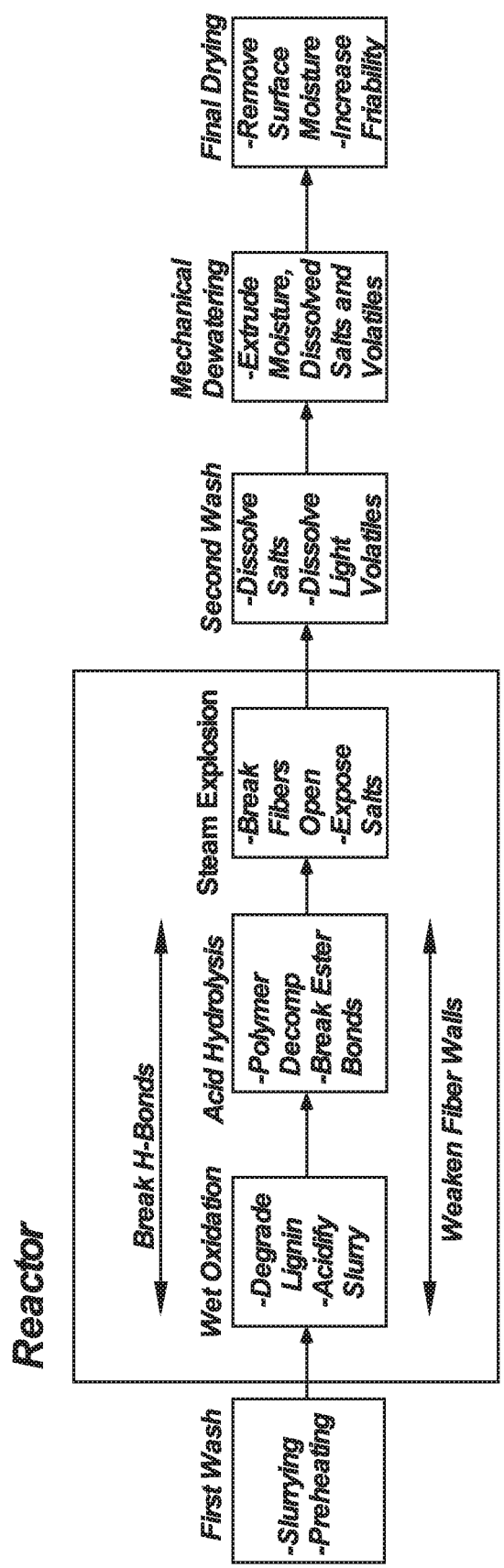
FIG. 1 shows a flow diagram of chemical and physical steps and features involved in the beneficiation/wash process described in the present disclosure.

It will be appreciated that the drawings are illustrative and not limiting of the scope of the invention which is defined by the appended claims. The embodiments shown accomplish various aspects and objects of the invention. It will be appreciated that it is not possible to clearly show each element and aspect of the present disclosure in a single figure, and as such, multiple figures are presented to separately illustrate the various details of different aspects of the invention in greater clarity. Similarly, not all configurations or embodiments described herein or covered by the appended claims will include all of the aspects of the present disclosure as discussed above.

DETAILED DESCRIPTION

Various aspects of the invention and accompanying drawings will now be discussed in reference to the numerals provided therein so as to enable one skilled in the art to practice the present invention. The skilled artisan will understand, however, that the methods described below can be practiced without employing these specific details, or that they can be used for purposes other than those described herein. Indeed, they can be modified and can be used in conjunction with products and techniques known to those of skill in the art in light of the present disclosure. The drawings and the descriptions thereof are intended to be exemplary of various aspects of the invention and are not intended to narrow the scope of the appended claims. Furthermore, it will be appreciated that the drawings may show aspects of the invention in isolation and the elements in one figure may be used in conjunction with elements shown in other figures.

Reference in the specification to "one embodiment," "one configuration," "an embodiment," or "a configuration" means that a particular feature, structure, or characteristic described in connection with the embodiment may be included in at least one embodiment, etc. The appearances of the phrase "in one embodiment" in various places may not necessarily limit the inclusion of a particular element of the invention to a single embodiment, rather the element may be included in other or all embodiments discussed herein.

Furthermore, the described features, structures, or characteristics of embodiments of the present disclosure may be combined in any suitable manner in one or more embodiments. In the following description, numerous specific details may be provided, such as examples of products or manufacturing techniques that may be used, to provide a thorough understanding of embodiments of the invention. One skilled in the relevant art will recognize, however, that embodiments discussed in the disclosure may be practiced without one or more of the specific details, or with other methods, components, materials, and so forth. In other instances, well-known structures, materials, or operations may not be shown or described in detail to avoid obscuring aspects of the invention.

Before the present invention is disclosed and described in detail, it should be understood that the present invention is not limited to any particular structures, process steps, or materials discussed or disclosed herein, but is extended to include equivalents thereof as would be recognized by those of ordinary skill in the relevant art. More specifically, the invention is defined by the terms set forth in the claims. It should also be understood that terminology contained herein is used for the purpose of describing particular aspects of the invention only and is not intended to limit the invention to the aspects or embodiments shown unless expressly indicated as such. Likewise, the discussion of any particular aspect of the invention is not to be understood as a requirement that such aspect is required to be present apart from an express inclusion of that aspect in the claims.

It should also be noted that, as used in this specification and the appended claims, singular forms such as "a," "an," and "the" may include the plural unless the context clearly dictates otherwise. Thus, for example, reference to "an evaporative dryer" may include an embodiment having one or more of such dryers, and reference to "the vibratory screen separator" may include reference to one or more of such vibratory screen separators.

As used herein, the term "generally" refers to something that has characteristics of a quality without being exactly that quality. For example, a structure said to be generally vertical would be at least as vertical as horizontal, i.e. would extend 45 degrees or greater from horizontal. Likewise, something said to be generally circular may be rounded like an oval but need not have a consistent diameter in every direction.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

Turning now to FIG. 1, diagram of the chemical and physical processes that underlie this teaching are shown. The process described herein disrupts the cross-linking barriers in biomass fibers to defeat fresh biomass recalcitrance to produce a dry, friable, high-energy-density material with reduced amounts of salts and light volatile material. Final drying may also increase the friability of the material. Friability implies that it can be ground to a powder with a size distribution comparable to that of coal when ground for use in a pulverized coal power plant. Friability is desirable so the beneficiated biomass can be used in a pulverized coal power plant, by itself or mixed with coal, without major capital modifications. All of these effects allow use of lower cost input material that can include whole biomass input rather than expensive heartwood or clean material. With the combined benefits produced through this teaching, biomass inputs may include slash, salt-laden hogged woodpiles, and waste piles, any of which can be used as fuel for boilers without pre-ignition, slagging, fouling, or corrosion.

Biomass consists primarily of cellulose, hemicellulose, and lignin located in the secondary cell wall of relevant plant materials. Pretreating and in-process treating of the wet biomass with pressurized steam produces several chemical reactions, explicitly described here. Wet oxidation is initiated, which starts the degradation of the lignin as well as produces some acid in the slurry as small side groups are cleaved from the hemicellulose to form small organic acids (for example, small side groups ranging from small acetyl groups to acetic acid). Acid is also produced in the oxygen-promoted depolymerization of cellulose and hemicellulose chains. Subsequent acid hydrolysis from the produced acid breaks ester bonds and continues polymer decomposition. No acid need be added externally to the process: the acid may be produced in situ and used for subsequent breakdown of polymers, especially the ester linkages between lignin polymers and lignin-cellulose polymeric cross-linkages.

Throughout this process, hydrogen bond disruption occurs through which hydrogen bonds interconnecting polymer fibers of cellulose and hemicellulose are also broken due to increased vibrational energy and the lowering of the dielectric constant in hot water. Once the fiber walls have been weakened after a certain residence time in the steam explosion vessel or reaction vessel, the pressure is rapidly released. With the rapid release of external pressure, the internal pressure within the cell must also be released, resulting in the bursting of the weakened cell wall. The steam explosion step breaks open the fibers to expose salts and light volatiles formed primarily from degradation of the hemicellulose for subsequent dissolution and extrusion. During steam explosion, the lignin also is affected. The ether linkages of high molecular weight lignin break to generate lower molecular weight lignin. Furthermore, it melts, redistributes, condenses, and forms beads on the surface of the cellulose micro-fibrils and thus increases the porosity of the microfibers.

Figure 2:
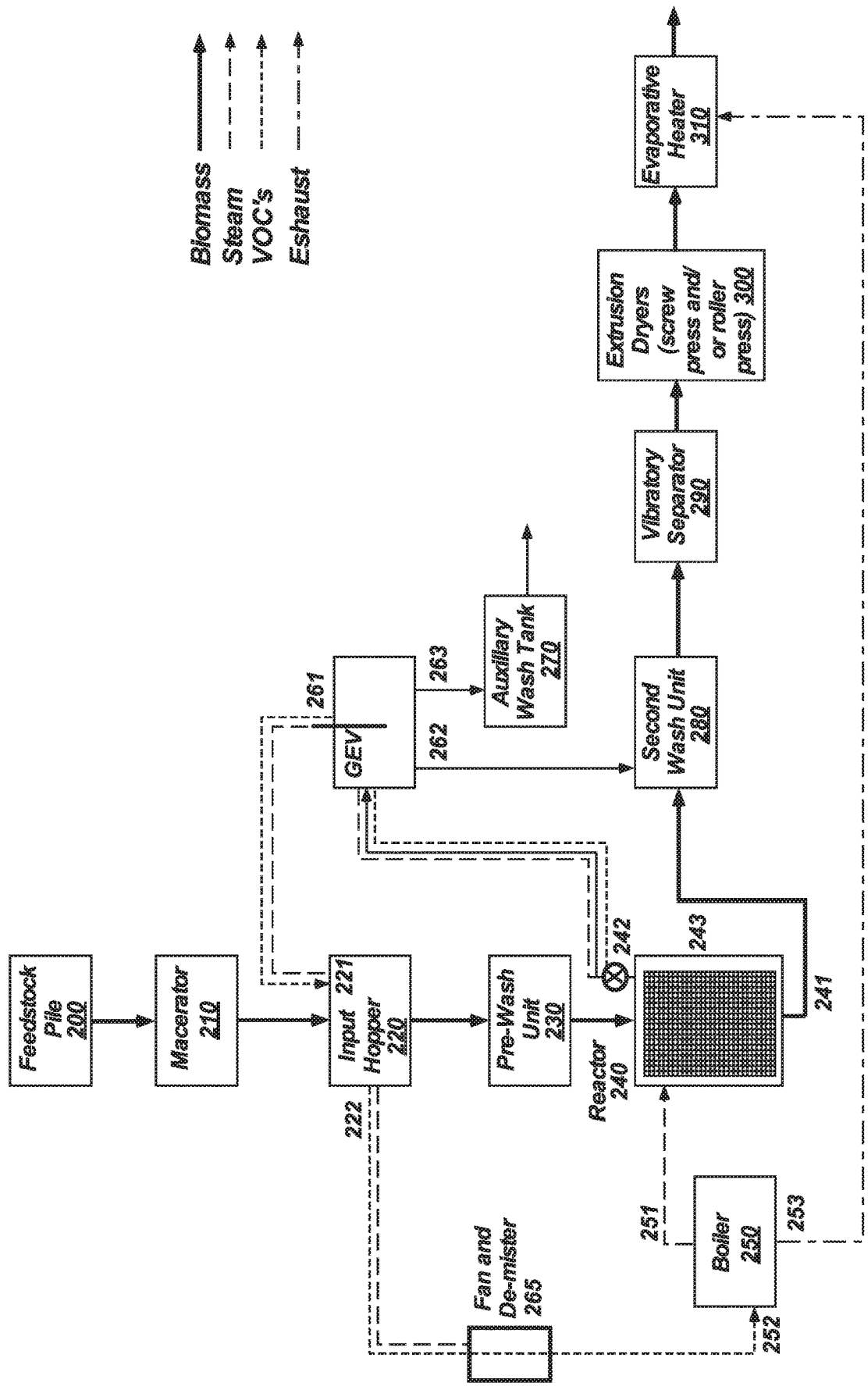
FIG. 2 shows a schematic of system components used in the beneficiation/wash process.

FIG. 2 shows a schematic of the equipment to process the biomass according to the steps described herein. The process may initially employ a macerating operation (210) to appropriately size and expose surface area from, for example, woody wastes or other dense materials. Generally, macerated materials enter the process at input hopper 220 in pieces of about one-half to quarter inch and smaller size. The macerating steps may macerate the biomass into various sizes depending on the desired results, for example, the biomass may be macerated into pieces of about 3.81 centimeters (1.5 inches) to about 0.635 centimeters (0.25 inches). Conveyor belts may take the macerated biomass from the input hopper to the pre-wash processing unit 230.

The macerated biomass input is introduced to a pre-wash processing unit or container 230. Besides wetting the material for subsequent steam explosion, this step can be used to remove unwanted external ash, dirt, and initiate a start at removing the salts. A short sluice between the input hopper and pre-wash unit removes the heavy rocks, pebbles, sand, etc. while allowing the lighter, floating biomass to be flowed into the pre-wash unit. The rocks, sand, etc. sink to the bottom trap, which can be opened periodically to remove them. A magnetic trap may be added (either at the macerator/hopper 220, the pre-wash container/processing unit 230, or at another point in the cycle) for removing any remaining iron scrap from the harvesting process such as bolts or nails.

Beginning at the input hopper 220 and/or the pre-wash unit 230 and extending through the drying steps, insulation of the external surfaces of the parts of the system may improve energy balance. Preservation of heat from one batch of biomass to the next may build a steady state temperature approaching water's boiling point and recycle what otherwise would have been lost energy. As described below, steam from the steam-explosion step may be directed to the input hopper 220, adding heat and starting the chemical processes that weaken the cell walls. Re-use of steam rather than just direct release to the environment conserves heat and improves the energy balance.

The pre-wash unit 230 may be an agitated/stirred vat or a dynamic trommel system, wherein water is contacted to the biomass conveyed via an auger up to the holding tank for the steam explosion vessel, or reactor, 240. The trommel may comprise, for example, an inclined screw/auger surrounded by a screen in a partially-filled water tank. The biomass may be wetted as it moves upward along the screw/auger while dirt is mechanically separated and falls through the screen to a removal container. The auger/water slurry may be surrounded by a screen through which the water and entrained dirt and salt can exit. In the trommel arrangement, an auger may be welded into a screen (for example, a screen with one-quarter inch holes) through which the water, dissolved salts, and any remaining entrained dirt can exit with the dirt falling to the bottom of the tank. The auger/screen unit may be semi-submerged in the water bath and inclined at about a 10 degree angle. The motion of the auger moves the in-coming biomass up through the trommel. Paddles placed periodically along the auger help move the biomass into and out of the water bath as it moves up and through the prewash unit, thereby agitating and washing the biomass. Nozzles above the trommel spray water on the biomass and clean it further. The biomass emerges from the auger and falls into a holding tank for the reactor. To remove contaminated water from the tank, a fraction may be pumped out to the water treatment plant, and replaced with an equal amount of fresh water.

At the pre-wash unit 230, chemicals suitable for permeating and disrupting biomass fibers and promoting wet oxidation and/or acid hydrolysis to disrupt hemicellulose and lignin cross-linking, and solubilize other contaminants, may also be added. The input biomass material could be mixed with appropriate chemicals to permeate the plant fibers and accelerate the chemical processes, including hydrogen-bond breaking, wet oxidation, and acid hydrolysis reactions to disrupt the hemicellulose and lignin cross-linking barriers. Additional chemical applications, depending on the physical properties of the biomass input, may comprise aqueous solutions of methanol, ammonium carbonate or carbonic acid. Other potential chemical applications include ammonia (leads to AFEX (Ammonia Fiber Explosion) process), acetone, acetonitrile, and different combinations of them. In addition, the use of solvents such as methanol may be desirable for biomass input having preservatives or a soft wood content to dissolve creosote or resins contained in the woody biomass to allow the beneficiation chemicals better contact with the fibers. For example, a 50:50 water:methanol mix by volume is effective at dissolving glue components (e.g. formaldehyde) used in plywood/demolition wood. Because of the higher volatility of methanol, the reactor must be designed for higher pressures to achieve the same temperature and effectiveness as pure water; pressures to 650 psi may be required and must be pre-engineered in specially made systems for these higher pressures for safety.

Figure 3:
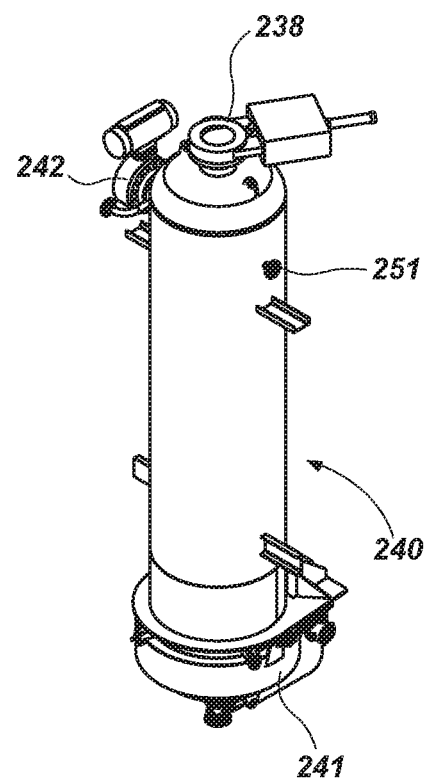
FIG. 3 shows a perspective view of an exemplary steam explosion vessel or reaction vessel.
Figure 4:
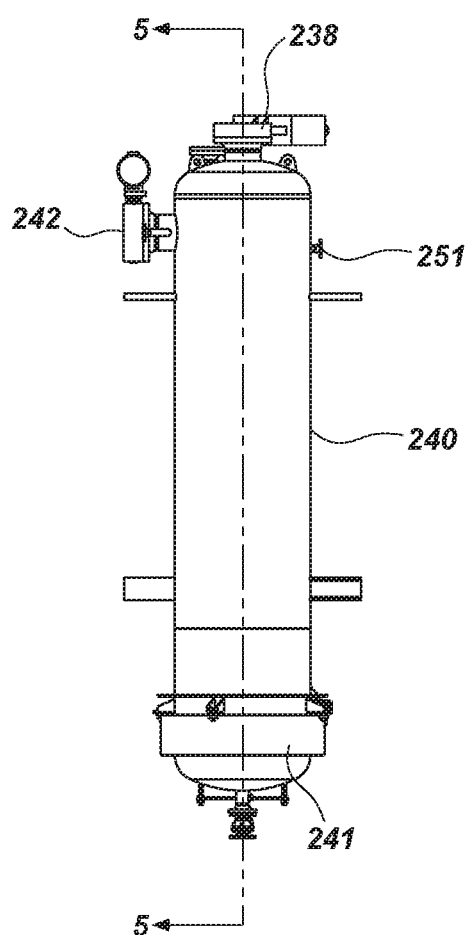
FIG. 4 shows a side view of the reaction vessel of FIG. 3.
Figure 5:
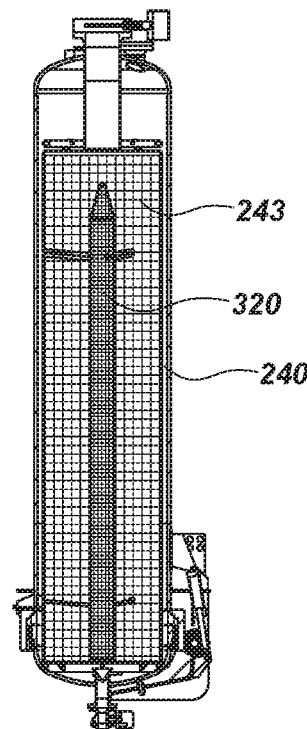
FIG. 5 shows a cross-sectional view of the reaction vessel of FIGS. 3 and 4, taken along line 5-5 of FIG. 4.

After the pre-wash unit 230, the biomass is mechanically passed into a vertically oriented steam explosion vessel or reaction vessel 240 for chemical conditioning on the cell walls followed by steam-explosion. FIG. 3 shows a perspective view of the reaction vessel 240, FIG. 4 shows a side view, and FIG. 5 shows a cross-sectional view of the reaction vessel taken along line 5-5 of FIG. 4. A valve 238 may allow for selectively opening and closing of the passageway from the pre-wash processing unit 230 to the steam explosion vessel 240. A steam input 251 may be disposed on the reaction vessel 240, connecting the reaction vessel to a boiler 250 or other source of steam (e.g., steam generator/thermal fluid heater combination). The vertical arrangement or generally vertical arrangement, with the input gate/valve 238 at top and output gate (such as an autoclave door) 241 on the bottom, may provide benefits over a horizontal orientation, including: ease of loading with mechanical or pneumatic conveyors; taking advantage of gravity for loading and unloading; size of biomass chips less critical compared to horizontal loading with potentially less grinding required at front end; and footprint of plant reduced. A horizontal-oriented reaction vessel module may also be used, but in some applications may be less effective.

All the surfaces exposed to the reaction in the reaction vessel 240 and subsequent wet biomass in the process may be formed from stainless steel. While other materials may be possible, in the present configurations no treatments or coatings that would allow for the use of less expensive carbon steel were found to be effective in the hot, wet reaction conditions with rapid expansion/contraction phases corresponding to high and low pressure conditions in the reaction vessel. The doors on either end of the reaction vessel 240 may be comprised of autoclave doors, o-port valves, knife valves, etc.

The reaction vessel 240 may comprise an inner perforated screen 243. The perforated plate/screen 243 may be formed from any suitable material, for example, stainless steel, and may be suspended within the reaction vessel with sufficient space between the screen 243 and reaction vessel wall, allowing the steam direct access to a much greater cross section of biomass. For example, the screen may separate the biomass from the wall of the reaction vessel by about 1.27 centimeters (0.5 inch) to about 5.08 centimeters (2 inches). In this manner, the perforated screen 243 may separate the biomass from the main body of the reaction vessel 240. The size of the holes in the screen 243 can be chosen based on the size of the biomass chips about may typically be about 0.3175 centimeters (one-eighth inch) to about 0.635 centimeters (one-quarter inch). The range could be expanded for smaller materials, such as sawdust and larger materials such as empty fruit bunches.

The screen 243 may also be provided with one or more perforated screen fingers 320 (see FIG. 5) disposed within the reaction vessel 240 and positioned within the biomass to increase exposure of the biomass to steam. The perforated screen fingers 320 may be positioned away from the wall of the reaction vessel 240 to maximize exposure of the biomass to the steam. Perforated screen fingers may be downcomers (open to steam from the top of the reaction vessel) and/or upcomers (open to steam from the bottom of the reaction vessel, as in the upcomer 320 shown in FIG. 4). For example, perforated screen downcomers (stalactite configuration) or upcomer(s) (stalagmite configuration) may be suspended/extended from the top/bottom. The pattern and number of fingers may be configured such that the maximum distance of any biomass to steam headspace is around 9 inches to increase steam penetration.

The use of the perforated screen 243 and/or screen finger(s) 320 may allow steam to surround the biomass, and may allow a large volume of biomass that would otherwise insulate from the steam, to be exposed to the steam, resulting in more fiber disruption. Without a perforated screen 243, a large volume of biomass may otherwise insulate the material from the steam, resulting in significantly less fiber disruption. The addition of fingers to shorten the maximum distance between a steam channel and the most deeply buried biomass may allow both better steam entrance/exposure to biomass material and better/quicker steam exit and hence better steam-explosion. These plurality of perforated finger screen liners may have a plurality of screen hole sizes.

After closing the reaction vessel 240, pressurized saturated steam is introduced into the reaction vessel from a boiler or steam generator 250. The exact reaction conditions (pressure, temperature, residence time) depend on the nature of the biomass input. Specific examples are given below in Table I. Typical conditions for woody biomass might be 400 to 450 psi, 448° F. for 15 to 20 minutes. Herbaceous materials may require less severe conditions (350 to 420 psi for 15 to 20 minutes). The temperature of the saturated steam is directly related to the pressure through the well-known Steam Tables.

Chemical effects such as hydrogen bond breaking, wet oxidation, and acid hydrolysis of the cellulose, hemicellulose, and lignin, occur during the retention time, weakening the cell wall in preparation for the rapid depressurization.

The profile of the applied chemical treatments may be tailored for particular biomass inputs. The reaction vessel's temperature, pressure, biomass residence time, and chemical concentrations are carefully controlled so as to optimize process conditions for a particular biomass input. Table I lists varying conditions for exemplary biomass inputs. (Table I is given by way of example, not of limitation. Other types of biomass inputs not typically used, such as railway ties, may require different conditions, such as different solvents like methanol, 50:50 methanol:water, pressures beyond 600 psi in the reaction vessel, and/or extra time in the reaction vessel.) Sensors may be strategically positioned within the reaction vessel 240 to provide real-time feedback to the control system to ensure optimization. The details of the applied chemical treatments versus particular biomass inputs and conditions may be captured in a library of algorithms and programmed to be applied.

After a predetermined residence time dictated by the characteristic biomass input, the pressure is released rapidly in the reaction chamber 240, for example by rapidly opening a valve 242. The rapid pressure release may produce a stream of outrushing steam. The perforated screen 243, which had allowed a better ingress of the steam to the biomass, now may give a larger cross section for rapid release and egress. The diameter of the rapidly opening pressure release valve 242 is the rate determining step for pressure release, not resistance from steam trying to find its way through the biomass. Larger valves allow for quicker depressurization, and different types of pressure release valves allow for different outcomes. Because of the large pressures (force per square inch) and surface areas involved, many types of valves, such as ball valves, may produce huge frictional forces that oppose fast opening. To avoid this problem, an offset butterfly valve may be used, in which an opening counter-force from the smaller side of the butterfly partially offsets the closing force on the other side of the valve. This force-balancing makes opening the valve in less than 500 microseconds practical with an off-the-shelf offset butterfly valve with a stepping motor. The minimized torque may allow for controlled but still fast opening. Alternatively, in another configuration, several smaller valves could be ganged together to open simultaneously. The combined cross section of the smaller valves may add up to the single cross section of the larger valve, but with the down side of additional vessel penetrations and may require a synchronization scheme.

There is a large burst of steam pressure during the rapid opening of the valve 242, followed by further steam flow for another 30 to 45 seconds as water from the wet biomass evaporates and leaves the reactor. This may cool the reactor and the inner screen, which cools to about the atmospheric boiling point of 100 degrees Celsius (212 degrees Fahrenheit). This allows subsequent loading of the next biomass batch to occur without large steam loss and difficulties associated with a hot surface and wet biomass. A considerable amount of this heat energy is kept in the system by directing the steam to the input hopper 220. Volatile organic compounds (VOCs) derived from the steam explosion step may be routed from the steam explosion vessel through the input hopper and directed to a boiler flame to incinerate the VOCs to eliminate emissions of light volatile organic compounds and simultaneously generate heat for the steam explosion step. The steam from the reaction vessel or steam explosion vessel may be fed into the input hopper 220, where some of it condenses and heats the biomass to 100 to 120 degrees F. (40 to 50 degrees C.).

The steam and the entrained volatile chemicals within the fibers are released quickly, breaking open the cell from the inside as the interior pressure is released in response to the release of the exterior pressure. Physical effects such as de-crystallization of cellulose and hemicellulose occurs in parallel with the breaking of the cell wall. The resulting biomass particles exhibit an increase in the size and number of micropores in their fibers, and resultantly, an increased surface area. The enhanced surface area and disrupted cellulose (polymer of glucose sugar monomers) of the biomass exposes the entrained/entrapped salts to subsequent washing (as detailed below).

Turning back to the overall process detailed in FIG. 2, the biomass from the reaction vessel 240 may pass to a second wash unit 280, while the steam (which contains fine particles of beneficiated biomass are entrained therein) passes to a cyclone-type gas expansion vessel (GEV) 260 to control the outrush of steam and capture the entrained biomass. The GEV 260 is a large-volume cyclone in which the outrushing steam is introduced tangentially. FIG. 6 shows a perspective view of the GEV 260, FIG. 7 shows a side view, and FIG. 8 shows a cross-sectional view taken along line 8-8 of FIG. 7. A downcomer pipe, or down tube 261, may extend from the top of the GEV 260 to a position below which the fines, and condensed steam from the reaction vessel is introduced. Some volatile organic compounds (VOCs) produced in the reaction vessel 240 may also be entrained in the out-rushing steam. The down tube 261 may release steam and VOCs from the GEV 260. The steam may be directed from the downcomer pipe 261 to the input hopper 220 to conserve BTUs and convey some moisture and heat to the input biomass. The input hopper 220 is not sealed, so pressure does not build up at the input hopper 220. Instead, a fan sucks excess steam pressure and entrained VOCs into the fan and de-mister section 265, wherein the steam is condensed and may be removed from the gas flow, blowing the VOCs to the air input 252 of the boiler 250 for incineration.

The GEV 260 may serve the purpose of separating the entrained fine, lignin-enriched particulates from the steam and VOCs, and these fine particulates may drop below the down tube input and be collected. The GEV 260 may include an input 264 for the steam, VOCs, and fines from the reaction vessel 240, a water input, a gas escape through the downcomer pipe 261 (which may lead to the input hopper 220), and an array of nozzles 266 for cleaning water and for pre-loading the bottom of the GEV 260 with water. The water may be pre-loaded before the explosion step and thus pre-positioned in the bottom of GEV to catch fines. Also shown are arrows 267 indicating the cyclone in the GEV. A slurry of fines and water 268 may collect at the bottom of GEV 260, and the slurry of fines and water 268 can exit the base of the GEV 260 through valve/exit 262.

As the steam enters the GEV through input 264, the energy of the resulting vortex is scrubbed through expansion and friction. Biomass particles drop out to the bottom of the GEV where they can be collected through valve 262, and the steam escapes through the downcomer pipe 261 to avoid pressure build-up. The fine particles collected at the bottom of the GEV 260 are enriched in lignin particles. Because of this differentiation, these particles are potentially a valuable by-product as material for other processes (fuel, chemical feedstock, plastics/polymers, sticky binder), and may potentially be collected and transferred to a washing step or collection bin/auxiliary wash tank 270 before further use.

The biomass fines may exit via valve 263 to an auxiliary wash tank 270 (or just an output hopper for the fines without a wash step) for removal of fines for separate process due to economic value of the predominantly lignin fine particles. In some configurations, these enriched lignin particles may be re-blended back to the main product in the second wash chamber 280. In other configurations, the enriched lignin particles may be introduced after the drying process and before pelletization. In other configurations, the biomass fines may exit via valve 262 at the bottom of the GEV and subsequently be added to the second wash unit 280. In some configurations, the process may be designed to either re-blend the biomass fines into the product stream (via valve 262) or remove the fines to a separate product stream (via valve 263). In some configurations, the process may be design with both valves to allow for both options. In other configurations, only one valve/exit port 262, 263 may be present in same system.

The biomass output from the reaction vessel 240 and potentially the bottom of the GEV 260 may be fed into a separate wash chamber 280. This wash chamber 280 may comprise, for example, an agitated/stirred vat or a dynamic trommel system, wherein water is contacted with the biomass being conveyed via an auger up to drying section (290, 300, 310 in FIG. 2). While the biomass could be washed within the reaction vessel 240, a separate tank such as wash chamber 280 may provide better washing and better throughput for the reaction vessel, with a better energy balance and without time wasted in reaction vessel 240 for a wash. It may also make the reaction vessel 240 easier and less expensive to manufacture. With the fibers of the biomass disrupted from the chemical and physical heat and pressure treatment in the reaction vessel 240, salts previously captured between the fibers and within the plant cells are now exposed to being dissolved by the water wash. By dissolving this recalcitrant salt, the salt can be subsequently removed by extruding the salt-laden water in the drying steps 290, 300 (see FIG. 2).

Furthermore, small organic materials are produced in the reaction vessel 240. These materials have been mostly freed by dissolving a fraction of the hemicellulose and side chain moieties broken-off from the hemicellulose, and include sugars, tannins, and small organic acids such as acetic acid. These materials also get washed out in the wash chamber 280, and in the water extrusion processes 290 and 300 along with the salts. Removing these oxygen-rich organic substances may improve the quality of the fuel because these soluble oxygen-rich organic substances possess lower heat density than the remaining beneficiated biomass. Removing them therefore reduces the light volatile component of the biomass, which is problematic in systems like pulverized fuel burners due to pre-ignition.

A distinct and separate wash chamber/tank 280 may also allow use of more material originally contaminated with salts such as sodium, potassium, and chloride that could have caused slagging, fouling, and corrosion in burners if they had not been washed out. Removal of this extra salt is important to economically use some biomass sources such as hogged/slash piles in the Northwest that have very high salt content. It also allows use, for instance, of an entire tree rather than just the heartwood because it can clean the dirt, salt, and light volatiles associated with, for instance, leaves from the material. By using entire trees, this process can use less expensive input biomass, including small invasive species like Eastern Red Cedar and mesquite that contain no economically viable heartwood. Typically, during the process described herein, sodium, potassium, and chlorine are reduced by 80 to 98 percent of their starting concentrations in the biomass.

In practice, there may be one or more reaction vessel/washing subsystems. In one configuration, four reaction vessel/washing subsystems may be provided that share a common GEV and subsequent drying subsection. By staggering the filling, reaction, explosion, and unloading times for each reaction vessel/washing subsystem, each of the four reaction vessel/washing subsystem may be performing a different stage in the process at any particular moment. In this manner, only one GEV, drying subsystem, etc., are required, thus simplifying and economizing the system as a whole. A more continual heating of several smaller reaction vessels or steam explosion vessels rather than the periodic, more intense heating of one larger vessel may provide a more efficient use of boiler steam/heat. Loading may be done more continuously, steam may be added more continuously (which means less stress for boiler and hence smaller boiler needed), and unloading may be done more continuously. Thus, the granularity of a batch process may be replaced with a more continuous process in terms of loading biomass, use of steam, and unloading biomass product. Sharing common equipment may also cut the capital costs of the plant.

As mentioned above, the washed biomass is moved from the post-reaction wash chamber 280 to the dryer sections 290, 300, and 310. The dryer sections may be comprised of several processes, and may utilize water separation/extrusion steps 290, 300 followed by an evaporative dryer 310. Mechanical drying may separate bulk water and dissolved salts and light volatile organic material from the beneficiated biomass through a vibratory screen separator 290 followed by a screw press and/or a roller press 300. The vibratory screen separator 290 (e.g., a vibratory screen separator such as those manufactured by SWECO™) allows water to flow through a screen at the bottom of a rotating/vibrating pan. By using two or more stages (for example, three stacked stages or three successive stages), such as a first screen with holes about 1 millimeter in diameter and subsequent screens with holes about 100 microns and then 39 microns in diameter, this "panning" arrangement allows bulk water flow through successively smaller holes while keeping the vast majority of biomass. The solid captured in each pan is pressed to the outside rim via a circular motion of the pan, eventually to find an off-ramp where it is removed and passed to the next step.

Figure 9:
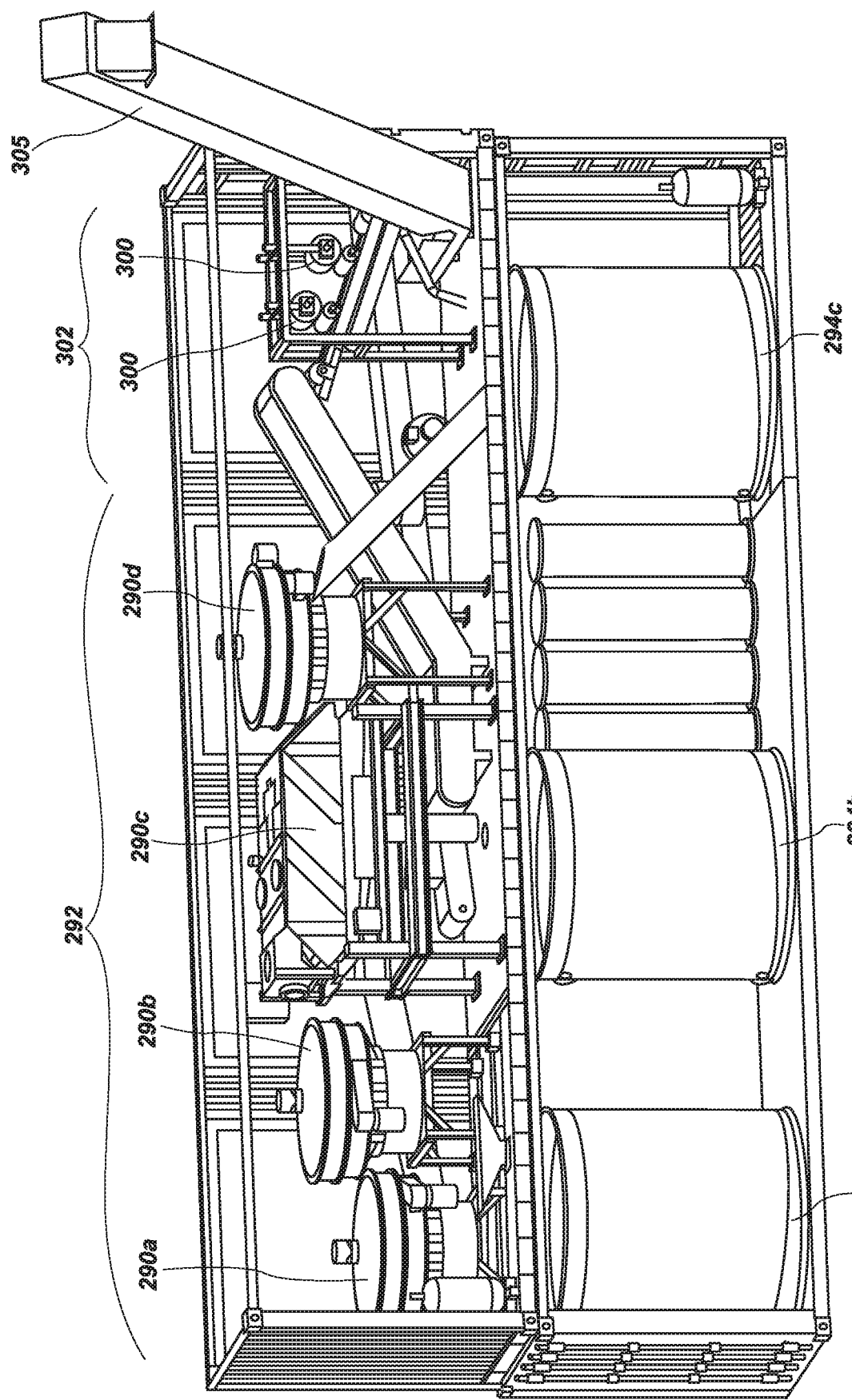
FIG. 9 shows a front, perspective view of an exemplary configuration of a dewatering module.
Figure 10:
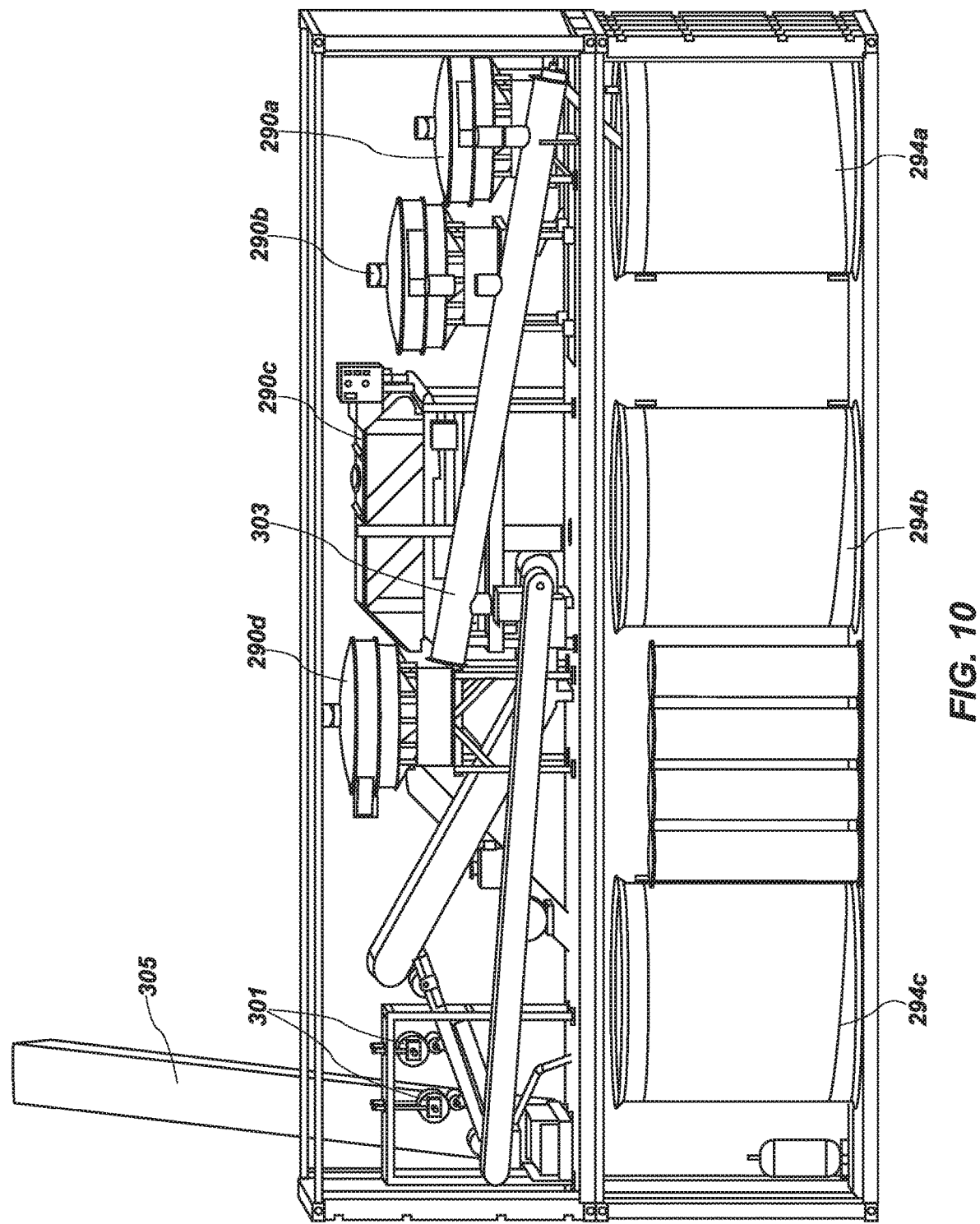
FIG. 10 shows a rear, perspective view of the dewatering module of FIG. 9.

FIG. 9 shows a front, perspective view of an exemplary configuration of a dewatering module comprising of one or more vibratory screen separators 290a, 290b, 290c, 290d and an extrusion dryer 300, and FIG. 10 shows a rear, perspective view of the dewatering module of FIG. 9. The dewatering module may generally consist of a vibratory separation section 292 (comprising one or more vibratory screen separators), and a pressing section 302 (comprising one or more presses). Below the vibratory separation section 292 and the pressing section 302, a bottom container having one or more storage tanks 294*a-c* may be provided.

Wet biomass may first enter the vibratory separation section 292, and be split to two vibratory screen separators 290*a, b*. These vibratory screen separators 290*a, b* may have, for example, 1 mm screens. Thus, biomass particles larger than 1 mm (>1 mm particles) may be captured by the screens and output to the pressing section 302. The water and small particles (<1 mm) may drop down to tank 294*a*.

The contents of tank 294*a* may be pumped up to the next vibratory screen separator 290*c* (in this example, a long SWEECO 290*c* as opposed to round SWEECO may be provided, but it will be appreciated that either long or round SWEECOs or other suitable screen separators may be used). The vibratory screen separator 290*c* may have a smaller screen, such as a screen of 0.1 mm (100 microns). The particles caught up in the screen (>100 micron particles) may be conveyed to the pressing section 302. The water and smaller particles (<100 micron particles) drop down to tank 294*b*.

The contents of tank 294*b* may be pumped up to a final vibratory screen separator 290*d*, which may have an even smaller screen size (for example, 39 microns). The particles caught up in the screen (for example, >39 micron particles) may be conveyed to the pressing section 302. The water and smallest particles (<39 microns) may drop down to tank 294*c*, and in some configurations may then be pumped to water treatment.

The pressing section 302 may include one or more of a simple press, a screw press, and/or a roller press. The particles caught by the vibratory screen separators may be subject to different types of pressing depending on their size. For example, the >100 micron and >39 micron particles may travel to the simple press, such as rollers 301, where water is squeezed from these small particles (water extruded may pass to tank 294*c*). The >1 mm particles may be subject to a screw press.

The material panned out of the vibratory screen separator(s) 290 may be quite wet, with a moisture content of around 80% and may be transferred to a screw press and/or roller press 300 (FIG. 2) for further extrusion. The screw press 303 (visible in FIG. 10) may comprise an auger, a screen, and an end plug, with the auger pushing the material against the screen and against the end plug which may be held place with air pressure (different pressures may be used depending on the desired outcomes; in some configurations, a pressure of about 50 psi may be used). Depending on the run conditions above (original maceration size, whether or not fines from gas expansion vessel have been added back in, retention time in the reaction vessel, etc.), there may be different size and softness of washed biomass. Smaller material may squeeze through screen, necessitating less pressure be applied to the plug. Larger or less soft material might plug the screw press, and may necessitate slower feed and throughput. The requirements of dryer material may also necessitate slowing down the screw press and maximizing plug pressure. Material squeezes out around the end plug at a moisture content of around 30% to 60% and may then be sent to a continuous roller press (such as rollers 301 in FIG. 10). Alternatively, the material may be passed from the screw press to an evaporative dryer.

The roller press operates at an effective pressure of around at least 1000 psi, with around 2000 to 3000 psi being more typical. With the fibers and fiber cells disrupted by the reaction vessel processes and further sheared in the screw press, the water is accessible and is essentially "surface" water, amenable to extrusion via roller press. Without the fiber disruption caused by the reaction vessel, 10,000 psi would not be sufficient to obtain these results.

The rollers 301 of the roller press can be embossed with either a diamond or herringbone design, mainly to trap the biomass material and carry it under the rollers. The roller(s) 301 may have a permeable belt underneath, and a vacuum applied to the permeable belt under the roller may aid in sucking the water away. The shear forces exerted by the extrusion dryer(s) 300 (screw press and/or roller press) may pulverized the particles down to an average size of hundreds of microns. Material leaving the roller press may have moisture of content of around 30% or higher. After different sized particles are subject to their respective presses, they may be re-combined with the other particles. The re-combined particles are conveyed to the evaporative dryer section 310 via a conveyor 305.

Figure 11:
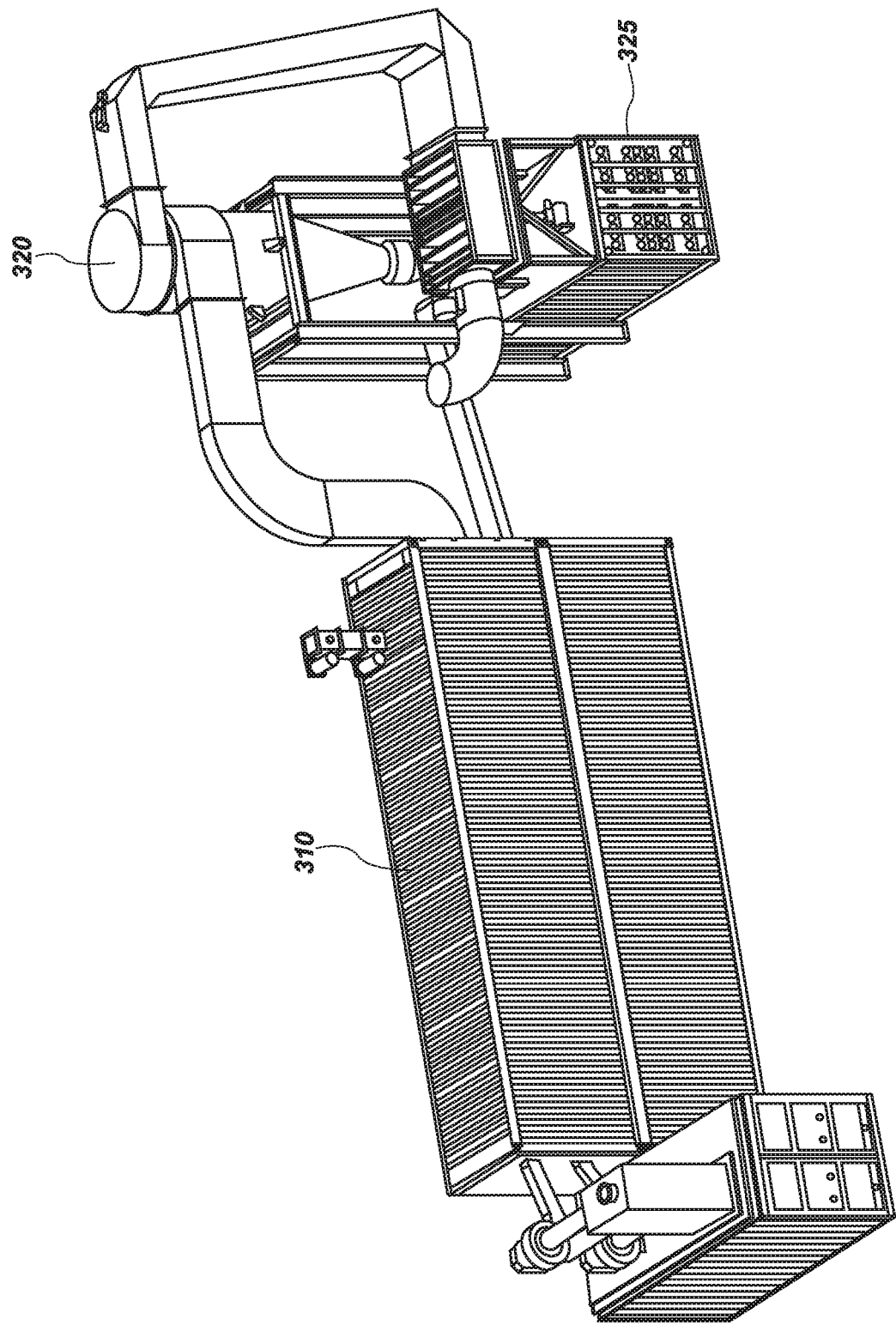
FIG. 11 shows a perspective view of an exemplary evaporative dryer.

After the extrusion dryer(s), material may be transported to an evaporative heater 310 to get the moisture content down to between about 7% to about 13%, which is considered a good moisture content for making pellets. The evaporative heater 310 may be constructed in several types of configurations. For example, a simple configuration of the evaporative heater simply runs the material along a conveyor belt through a hot room with air stream or ventilation, where the heat may be at least partially supplied from the contained exhaust of the boiler 250 via a connection 253 between the exhaust of the boiler and the evaporative heater 310 (FIG. 2 shows schematically the connection 253 between the boiler 250 and the evaporative heater 310). In some configurations, a moisture sensor may be included, with a feedback mechanism to automatically adjust the parameters for a consistent final moisture content. FIG. 11 shows a perspective view of an evaporative heater 310, with an inlet 315 for biomass from the extrusion dryers.

A more forceful configuration may suck the material through a flash dryer, consisting of a serpentine set of pipes leading to a vortex 320, to capture dried particles. The biomass may be sucked into a stream of hot air (for example, around 300° to 420° F.) through a rotating air-lock valve, causing it to fly and crash into the barriers repeatedly, thus breaking up the biomass into micron-sized particles. Pipes along the straight lengths may have a larger diameter than pipes along the corners to maximize the crashes of the particles into side barriers and increase residence time. The material is removed via a second air lock and allowed to cool. Another possible configuration of an evaporative heater 310 may be a commercially available evaporative dryer such as a fluidized bed dryer. Ideally the oxygen content of this air should be kept below about 14% to prevent any combustion. Nitrogen is another alternative, or the sub-saturated steam from the evaporating water from the biomass supplemented with a small amount of steam from the boiler may be used to inert the atmosphere.

Whatever configuration is used, the evaporative heating stage further removes remaining light volatile chemicals and lightly pyrolizes the biomass, increasing the friability and therefore improving grindability. The friability imparted by both the steam explosion in the reaction vessel 240 and the drying process 310 is a unique characteristic for the biomass material produced as a result of the process described herein: the fibers which make up biomass typically impart a stringiness to the material when produced from other processes that prevent grinding to a size distribution typical of coal. The dried biomass at this point is typically a brown powder ready to be pelletized or briquetted for transportation. It may be stored in a product hopper 325 (FIG. 11).

Energy may be conserved and used throughout the process described herein, particularly the steam produced in the reaction vessel 240. For example, referring to the overall process in FIG. 2, steam/biomass fines/VOCs leave the reaction vessel 240 in steam explosion through rapid release valve 242 and go to the GEV 260. In the GEV 260, the biomass fines lose energy in the cyclone and drop to the bottom. The steam and VOCs escape (due to pressurization) through the downcomer pipe 261, which may be connected to the input hopper 220 through connection 221. The head space of the input hopper 220 may be large enough to accommodate this on-rush of pressure (with the headspace approximately equal to volume of biomass stored in hopper), and a pressure relief plate may be installed to keep the pressure below 5 psig (a thin-walled 55 gallon drum may withstand a pressure of 6 psig).

In the input hopper 220, the steam gives up most of its heat energy, condensing to hot water in contact with the input biomass, thus starting the chemical processes involved in beneficiation. As some of the steam condenses, it may heat the biomass to 100 to 120 degrees F. (40 to 50 degrees C.) to start the chemical processes.

Any remaining pressure from the steam explosion step is vented through pipe 222 or output 222 in input hopper 220, which may be connected to the boiler 250. In addition to this periodic pressure increases due to steam explosion, a fan may also be provided to drive the process by pulling air through fan/demister pad unit 265. The demister pad may remove the remaining steam/condensate and allow the VOCs to proceed to be mixed into the air intake of the boiler 250 and hence to be burned in the boiler rather than exhausted to the atmosphere. Thus, VOCs derived from the steam explosion step may be routed from the steam explosion vessel through the input hopper and directed to a boiler flame to incinerate the VOCs to eliminate emissions of light volatile organic compounds and simultaneously generate heat for the steam explosion step.

It will be appreciated that fabrication of the system may be accomplished many different ways. To facilitate assembly and maintain the possibility of moving the system to different sites without complete disassembly and re-assembly, components may be built to fit into standard transportation containers. This may also allow easy equipment movement. The containers may also provide inexpensive support structure for some of these components. Finally, the use of Victaulic-type couplings for non-pressurized pipe runs may have some advantages, including ease of assembly for containerized parts, cleaning out any clogs, and ease of maintenance.

EXAMPLES

The process employed a chipper to appropriately size and expose surface area. Generally, materials were macerated to about 1.27 to 0.635 centimeters (one-half to one-quarter inch) and smaller size, but larger pieces of biomass were used. As noted in Table 1, there was a tradeoff in chipping to smaller sizes versus the pressures/retention times required in the reactor. For example, 1.27 centimeter-sized (one-half-inch) Empty Fruit Bunch (EFB) could be beneficiated at 350 psi saturated steam and half hour retention time, while 5.08 centimeter-sized (2 inch) EFB required 385 psi saturated steam and 25 minutes retention time. Various reaction conditions are possible, and it will be appreciated that numerous combinations of reaction conditions are contemplated. Table I shows the chip size, solvent, temperature, etc., used for each type of biomass in one example. Table II shows the chip size, solvent, temperature, etc., used for each type of biomass in another example.

TABLE I

|  | EMPTY FRUIT BUNCHES (EFB) | TRUNKS FROM MALAYSIAN PALM TREES | DOUGLAS FIR | HOGGED FUEL | MIXED WOOD IDAHO | PALLETS (KILN DRIED) |
|---|---|---|---|---|---|---|
| Chip size (inches) | 2 | ½ to 1 | 1 to 2 | ¼ to 1 | ⅛ to ¼ | sawdust |
| Solvent used in pre-wash | water | water | water | water | water | water |
| Temperature of the reaction vessel (degrees C.) | 190 to 195 | 200 to 202 | 200 to 202 | 200 to 202 | 200 to 202 | 201 to 204 |
| Pressure of the reaction vessel (psig) | 195 to 200 | 210 to 220 | 210 to 220 | 210 to 220 | 210 to 220 | 215 to 230 |
| Residence Time in reaction vessel (min) | 20 to 25 | 25 | 30 | 30 | 30 | 35 to 40 |
| Starting water content (%) | 8.8 | 67.8 | 55.6 | 30.4 | 27.5 | 3.7 |
| Final water content (%) | 8.5 | 7.1 | 4.7 | No data | 9.3 | 4.7 |
| % fixed carbon (dry basis) (start → finish) | 13.6 → 18.1 | 14.0 → 17.6 | 10.6 → 20.2 | 24.0 → 33.8 | 13.7 → 20.8 | 12.5 → 13.3 |
| % volatiles (d/b, both light and heavy | 81.8 → 79.2 | 79.2 → 79.6 | 87.8 → 78.1 | 81.6 → 65.7 | 85.4 → 78.5 | 86.3 → 76.3 |

TABLE I-continued

|  | EMPTY FRUIT BUNCHES (EFB) | TRUNKS FROM MALAYSIAN PALM TREES | DOUGLAS FIR | HOGGED FUEL | MIXED WOOD IDAHO | PALLETS (KILN DRIED) |
|---|---|---|---|---|---|---|
| volatiles) (start → finish) | | | | | | |
| % ash (d/b) (start → finish) | 2.84 → 2.96 | 6.26 → 2.60 | 0.10 → >0.10 | 0.92 → 0.73 | 0.75 → 0.38 | 0.63 -> 0.56 |
| Heat content (BTU/pound) (start → finish) | 7939 → 9346 | 7758 → 8981 | 8443 → 9805 | 8923 → No data | 8699 → 9888 | 8796 → 9500 |
| Salt reduction $K^+$ (ppm) (start → finish) | 8720 → 344 | 24800 → 457 | 328 → <85 | 811 → No data | N/D | N/D |
| Salt Reduction $Na^+$ (ppm) (start → finish) | 131 → <100 | 515 → <100 | <95 → <85 | 115 → No Data | 612 → <100 | N/D |
| Salt reduction $Cl^-$ (wt %) (start → finish) | 0.12 → <0.10 | 1.22 → 0.13 | <0.10 → <0.10 | N/D | 0.11 → <0.10 | N/D |

TABLE II

|  | Empty Fruit Bunches (EFB) | Trunks from Malaysian Palm Trees | Douglas Fir | Hogged Fuel | Mixed Wood Idaho | Pallets (kiln dried) |
|---|---|---|---|---|---|---|
| Chip size (inches) | 2 | ½ to 1 | 1 to 2 | ¼ to 1 | ⅛ to ¼ | sawdust |
| Solvent used in pre-wash | water | water | water | water | water | water |
| Pressure of reaction vessel (psig) | 385 to 400 | 400 to 420 | 410 to 420 | 410 to 420 | 410 to 420 | 415 to 430 |
| Temperature of reaction vessel (degrees C.) | 227 to 229 | 229 to 232 | 231 to 232 | 231 to 232 | 231 to 232 | 231 to 233 |
| Residence Time in reaction vessel (min) | 20 to 25 | 25 | 30 | 30 | 30 | 35 to 40 |
| Starting water content (%) | 8.8 | 67.8 | 55.6 | 30.4 | 27.5 | 3.7 |
| Final water content (%) | 8.5 | 7.1 | 4.8 | 10 | 9.3 | 4.7 |
| % fixed carbon (dry basis) (start→finish) | 13.6 → 18.1 | 14.0 → 17.6 | 10.6 → 20.2 | 24.0 → 33.8 | 13.7 → 20.8 | 12.5 → 13.3 |
| % volatiles (d/b, both light and heavy volatiles) (start→finish) | 81.8 → 79.2 | 79.2 → 79.6 | 87.8 → 78.1 | 81.6 → 65.7 | 85.4 → 78.5 | 86.3 → 76.3 |
| % ash (d/b) (start→finish) | 2.84 → 2.96 | 6.26 → 2.60 | 0.10 → >0.10 | 0.92 → 0.57 | 0.75 → 0.38 | 0.63 → 0.56 |
| Heat content (BTU/pound) (start→finish) | 7939 → 9346 | 7758 → 8981 | 8443 → 9805 | 8923 → 10,617 | 8699 → 9888 | 8796 → 9500 |
| Salt reduction $K^+$ (ppm) (start→finish) | 8720 → 344 | 24800 → 457 | 328 → <85 | 811 → 354 | N/D | N/D |
| Salt Reduction $Na^+$ (ppm) (start→finish) | 131 → <100 | 515 → <100 | 95 → <85 | 115 → <100 | 612 → <100 | N/D |
| Salt reduction $Cl^-$ (wt %) (start→finish) | 0.12 → <0.10 | 1.22 → 0.13 | <0.10 → <0.10 | 0.006 → <0.006 | 0.11 → <0.10 | N/D |

Pre-Wash Unit

The chipped biomass input is introduced to a pre-wash processing unit. For studies in Table I, the chips are placed into a stainless steel cylindrical cage, with a diameter of about 20 centimeters (about 8 inches), a length of about 3.13 meters (about 10 feet, 4 inches), a total volume of about 102 liters (6230 cubic inches), with 0.47 centimeters (3/16 inch) holes in the cage. The chips are placed in the stainless steel cylindrical cage, and both ends are closed. The loaded basket is washed with a hose and then dunked in a trough filled with water, where it is agitated for a minute and allowed to sit for about 10 to 15 minutes before being removed and allowed to drip for 3 to 5 minutes. Alternatively for Douglas Fir and Oregon Hogged Fuel, the chips are loaded into a trammel semi-submerged in water (trammel details above). The material is augered through the water in the trammel, where it empties to a conveyor belt and then dropped into the basket described above.

Reaction Vessel or Steam Explosion Vessel

The basket or cage, still dripping wet from the previous wash step, is slid into the reactor through an open o-port, which is then closed. Steam from a boiler is applied to the 290 psi limit the boiler can supply. From there, the temperature and pressure are increased by heating the reaction vessel or steam explosion vessel 240 with electric bandheaters surrounding the stainless steel reactor to reach the desired pressure of around 400 psi. If necessary, further reaction time is allowed at the final desired pressure. The reaction vessel's temperature, pressure, and biomass residence time are carefully controlled so as to optimize process conditions for a particular biomass input as set forth in Table I.

After a desired reaction time, the rapid release valve is opened in <0.5 seconds. In the studies for Table I, this valve consisted of a 3" diameter pneumatically actuated ball valve pressurized to 130 to 150 psi. The resulting rapid pressure release produced a stream of outrushing steam that is piped to the gas expansion vessel. The perforated screen, which had allowed a better ingress of the steam to the biomass, now gives a larger cross section for rapid release and egress.

Gas Expansion Vessel

In addition to the beneficiated material left in the basket, fine particles of beneficiated biomass are entrained in the stream of released steam. A gas expansion vessel is used to control the outrush and capture the entrained biomass. The gas expansion vessel is a large-volume cyclone in which the outrushing steam is introduced tangentially. A downcomer pipe is built into the center top of the gas expansion vessel to give the steam eventual egress so the pressure inside the gas expansion vessel remains low. As the energy of the resulting vortex is scrubbed through expansion and friction, biomass particles drop out to the bottom of the gas expansion vessel where they are collected, and the steam escapes through the downcomer pipe to avoid pressure build-up. The fine particles are collected and transferred to the second wash unit where they are recombined with the contents of the basket.

Second Wash Unit

The biomass output from the reaction vessel and the bottom of the gas expansion vessel are fed into a separate, second wash chamber. This wash chamber comprises a vat agitated/stirred by compressed air, wherein clean water is contacted with the biomass. With the fibers of the biomass disrupted from the chemical and physical heat and pressure treatment in the reaction vessel, salts previously captured between the fibers and within the plant cells are exposed and dissolved by the water wash. By dissolving these recalcitrant salts, the salts (especially consisting of sodium, potassium, and chloride ions which cause corrosion, slagging and fouling) are subsequently removed by extruding the saltladen water in the drying steps. Furthermore, small organic materials are produced in the reactor. These light volatile materials also get washed out in the wash chamber/water extrusion processes along with the salts.

To determine the amount of light volatile material removed, the weight of material lost upon heating from 105 degrees C. to 250 degrees C. is measured, for the raw biomass and for the beneficiated biomass. The material is first heated to 105° C. to drive off the moisture in the material. The dried weight is noted after the material reaches a steady weight (typically 45 minutes to 1 hour). The material is then heated to 225° C. for several minutes, followed by 5° incremental temperature increases to 250° C. After an hour, the weight stabilizes and is noted. The weight loss represents the amount of light volatile material that could be problematic in subsequent use as a fuel. As noted in Table I, on a dry basis, herbaceous material went from a range of 40 to 70% down to a range of 30 to 40%, soft woods went from a range of 60 to 80% down to a range of 30 to 50%, and hard woods went from a range of 40 to 50% down to a range of 35 to 45%. By reducing the amount of light volatiles, the material is made more coal-like.

Dryer Sections

The washed biomass slurry is pumped from the postreaction wash section to the dryer sections. The dryer sections are comprised of several processes, using water separation/extrusion steps followed by an evaporative final dryer. Bulk water is separated from the beneficiated biomass through a vibratory screen separator (SWECO Vibro-Energy Separator) or filter sock (50 micron filter) followed by a screw press (Vincent Screw Press). The vibratory screen separator allowed free water to flow through a screen at the bottom of stacked rotating/vibrating pans. Three stacks are used with screen sizes of 1 mm, 100 micron, and 39 micron screens. This panning arrangement allows bulk water seep through while keeping the vast majority of biomass on top of the three screens. The resulting water is only faintly colored—any further screening for smaller particles may not be cost effective. The solid captured in each pan is pressed to the outside rim via a circular motion of the pan, eventually to find an off-ramp where it is removed and passed to the next step.

The use of three stacked pans to capture the material rather than just one pan using the 39 micron screen may decrease clogging the screen. By spreading the material by size through three screens rather than only one with the very smallest hole size, the potential to clog reduces, thereby letting the water to drip through the screens rather than ponding on the surface of a clog.

The material panned out of the vibratory screen separator or removed from the filter sock is wet, with moisture contents different for different sized particle layers. A moisture content of 80 to 85% remains in the 39 to 100 micron fraction, while the larger-sized fractions retain 70 to 80% moisture content.

The combined material is transferred to a screen compression press for further water extrusion. An auger pushes the material against a screen and against an end plug held in place with about 50 psi pressure. Material squeezed out around the end plug at a moisture content of about 45 to about 60%. The shear forces exerted by the screw press pulverize the particles down to an average size of hundreds of microns.

Finally, the material is transported to an evaporative heater to obtain a moisture content of 10±3%, the preferred moisture content for making pellets. Some of the samples (Douglas Fir, Hog Fuel) are put through a dryer (Stelter and Brink, LTD SSP Dryer), which runs the material along a conveyor belt or vibrating ramp through a hot room with hot air stream. Under a moderate air flow, the dried material is blown off the bulk material and into a cyclone collector. The final moisture content of the beneficiated biomass can be roughly controlled by the dryer conditions such as the burner temperature (410° F. to 435° F.) and fan speed.

Table II shows the results for six different drying test, performed using Douglas Fir and Oregon Hog Fuel. Each test started off with a moisture content of 40%. The burner temperature, plenum temperature, and final moisture content were measured.

As seen in Table II, there is some variation in the resulting final moisture content between similar tests (for example, test 4 vs. test 5 in Table II).

TABLE II

| TEST | BURNER TEMPERATURE (F.) | PLENUM TEMPERATURE (F.) | FAN SPEED (HZ) | FINAL MOISTURE CONTENT (%) (START→FINISH) |
|---|---|---|---|---|
| 1 | 390 | 310 | 50.5 | 40→20 |
| 2 | 413 | 328 | 50.5 | 40→18 |
| 3 | 435 | 355 | 42.8 | 40→7 |
| 4 | 430 | 345 | 42.8 | 40→8 |
| 5 | 431 | 345 | 42.8 | 40→12 |
| 6 | 435 | 346 | 42.8 | 40→6 |

Other samples (EFB, Malaysian trunks, pallet material) are put through a flash dryer, consisting of a serpentine set of pipes leading to a vortex, to capture dried particles. The biomass is sucked into a stream of hot air (390° F. to 420° F.) through a rotating air-lock valve and caused to fly and crash into the barriers repeatedly, thus breaking up the biomass into micron sized particles. The material is separated from the created steam in a cyclone stage and removed from the cyclone and allowed to cool. Several cycles may be required to get the moisture content down to around 10%.

In various configurations, this evaporative drying stage further removes light volatile chemicals and lightly pyrolizes the biomass, causing it to be more friable and therefore have better grindability. The dried biomass at this point is a brown powder ready to be pelletized or briquetted for transportation. It may be stored in a product hopper.

Friability is an important factor when considering a fuel for mixing with or supplanting coal in a utility pulverized coal power plant, where the pellets would be put through a bowl mill for pulverization the same way that coal is. Milling tests using the dried biomass prepared according to the present disclosure were conducted. A one ton/hour milling test was conducted using a 15%:85% (dried biomass: Sufco coal) by weight mixture. Dried biomass included beetle kill Ponderosa, Douglas-fir, Spruce, and Pinyon from Manti-La Sal Forest. Conclusions reached for the 15/85 mixture versus 100% coal include: high heating value of mixture 10,246 BTU/lb vs 10,551 BTU/lb for 100% coal; mill power requirements were not increased; no increase in the fraction of large particles of milled material; requirement of 70% pass-through 200 mesh was achieved (i.e., 70% of particles in the powder are less than 74 microns in size, and pass through a screen with 200 mesh (200 wires per inch, hole size of 74 microns)); mill outlet temperature was only slightly higher for blend, indicating no unwanted reaction in mill.

Thus there is disclosed multiple configurations, systems, and methods for beneficiating and cleaning biomass. It will be appreciated that numerous modifications may be made without departing from the scope and spirit of this disclosure. The appended claims are intended to cover such modifications.

What is claimed is:

1. A process for producing a beneficiated solid biomass fuel, comprising:
   collecting raw biomass in an input hopper;
   prewashing the raw biomass in a prewash container to remove contaminants;
   preheating the raw biomass to weaken cells walls of the raw biomass and initiate breaking of hydrogen bonds, wet oxidation and acid hydrolysis of the raw biomass;
   pressurizing the prewashed and preheated biomass in an inner perforated screen of a reaction vessel, the inner perforated screen separating the biomass from a wall of the reaction vessel and the inner perforated screen comprising one or more perforated screen fingers, the one or more perforated screen fingers comprised of a screen having holes of about 1 millimeter to about 5 centimeters, and disposed within the reaction vessel and positioned within the biomass to increase exposure of the biomass to steam;
   rapidly depressurizing the reaction vessel to disrupt a structure of the biomass and release biomass salts and light volatile organic compounds entrained within the biomass and produce steam containing at least partially lignin-enriched fine particles;
   releasing the steam and condensed steam from the reaction vessel entrained with fine lignin-enriched particles into a cyclone-type gas expansion and gas-release vessel configured to capture the entrained fine lignin-enriched particles from the steam;
   routing the steam from the cyclone-type gas expansion and gas-release vessel to the input hopper to recapture heat from the steam and condensed steam to heat and wet the biomass in the input hopper;
   subjecting the biomass to a second washing step to remove additional salts and light volatile organic compounds derived from the biomass;
   mechanically removing a portion of water from the biomass with continuous throughput water removal steps, wherein a resulting biomass comprises less than about 50% water by weight and wherein additional salts and light organic compounds derived from the resulting biomass are removed with the water; and
   heating the resulting biomass to evaporatively remove an additional portion of the water and produce a friable biomass, wherein the friable biomass comprises less than about 25% water by weight.

2. The process of claim 1, wherein the raw biomass is macerated to a size of less than about 1.5 inches.

3. The process of claim 1, wherein the raw biomass is macerated to a size of less than about 1.0 inches.

4. The process of claim 1, wherein the raw biomass is macerated to a size of less than about 0.5 inches.

5. The process of claim 1, wherein the raw biomass is macerated to a size of less than about 0.25 inches.

6. The process of claim 1, wherein the contaminants of the prewashing include dirt, rocks/pebbles, salts, and/or other debris.

7. The process of claim 1, wherein the prewashing further comprises adding chemicals suitable for permeating and disrupting biomass fibers and promoting wet oxidation and/or acid hydrolysis to disrupt hemicellulose and lignin cross-linking, and solubilize other contaminants.

8. The process of claim 7, wherein the chemicals are selected from methanol, ammonium carbonate, carbonic acid, ammonia, acetone, and acetonitrile.

9. The process of claim 1, wherein the reaction vessel comprises at least one perforated finger screen extending into the biomass.

10. The process of claim 9, wherein the at least one perforated finger screen comprises at least one screen liner.

11. The process of claim 1, wherein volatile organic compounds derived from pressurizing and rapidly depressurizing the reaction vessel are routed from the reaction vessel through the input hopper and directed to a boiler flame to incinerate the volatile organic compounds to eliminate emissions of light volatile organic compounds and simultaneously generate heat for pressurizing and rapidly depressurizing the reaction vessel.

12. The process of claim 1, wherein the process is performed in a vertical orientation to facilitate gravitational feeding of the biomass and unloading of the resulting biomass.

13. The process of claim 1, wherein the reaction vessel further comprises at least one offset butterfly valve configured to release steam.

14. The process of claim 13, wherein the at least one offset butterfly valve releases pressure in less than about 500 msec.

15. The process of claim 13, wherein the offset butterfly valve comprises two or more offset butterfly valves.

16. The process of claim 1, further comprising the step of mechanical drying through vibratory separation followed by compression in a screw press.

17. The process of claim 16, wherein the step of mechanical drying through vibratory separation comprises a first separation of biomass using a screen having about 1 mm holes and at least a second separation of biomass using at least one screen having one of:
about 100 micron holes and about 39 micron holes.

18. The process of claim 17, further comprising the step of removing additional amounts of water in a continuous roller press.

19. The process of claim 18, wherein the continuous roller press is operated at a pressure of at least 1,000 psi.

20. The process of claim 19, wherein the continuous roller press is operated at a pressure of from about 2000 to 3000 psi.

21. The process of claim 1, further comprising the step of heating the resulting biomass to evaporatively dry the biomass down to final moisture content of from about 7% to 13% water by weight to produce the friable biomass.

22. The process of claim 1, further comprising the step of heating the resulting biomass to evaporatively dry the biomass down to final moisture content of from about 10% water by weight to produce the friable biomass.

23. The process of claim 1, further comprising the step of collecting the entrained fine lignin-enriched particles from the cyclone-type gas expansion and gas-release vessel and combining the fine lignin-enriched particles with the biomass.

24. The process of claim 23, further comprising the step of forming a pellet from the friable biomass.

25. The process of claim 24, wherein the pellet is formed by combining the biomass with dried fine lignin-enriched particles derived from the cyclone-type gas expansion and gas-release vessel.

26. The process of claim 1, wherein heating the biomass to evaporatively remove an additional portion of the water produces the friable biomass comprising from about 10% to about 13% water by weight.

27. The process of claim 1, wherein the mechanically removing of the portion of water from the biomass with continuous throughput water removal comprises one or more of a vibratory screen, a compression auger, a roller press, and a screw press.

28. The process of claim 1, wherein the prewashing comprises using a trommel having an inclined screw/auger surrounded by a screen in a partially-filled water tank and the biomass is wetted as it moves upward along the inclined screw/auger while dirt is mechanically separated and falls through the screen to a removal container.

29. The process of claim 1, wherein the perforated screen fingers are positioned away from the wall of the reaction vessel to maximize exposure of the biomass to the steam.

30. An improved process for separating a beneficiated solid biomass fuel entrained in steam, comprising:
pressurizing biomass in an inner perforated screen of a reaction vessel, the inner perforated screen spaced apart from a wall of the reaction vessel, and the inner perforated screen comprising one or more perforated screen fingers extending into the biomass, the one or more perforated screen fingers having holes of about 0.3 centimeters to about 0.7 centimeters;
rapidly depressurizing the reaction vessel to disrupt a biomass structure and release biomass salts and light volatile organic compounds entrained within the biomass and produce steam and condensed steam containing at least partially lignin-enriched fine particles; and
releasing the steam and condensed steam from the reaction vessel entrained with fine lignin-enriched particles into a cyclone-type gas expansion vessel configured to separate the entrained fine lignin-enriched particles from the steam, wherein the cyclone-type gas expansion vessel comprises a down tube extending from a top of the cyclone-type gas expansion vessel to a position below which the at least partially lignin-enriched fine particles, steam and condensed steam from the reaction vessel are introduced in the cyclone-type gas expansion vessel, wherein a bottom of the down tube comprises a steam input and a top of the down tube comprises a steam exit, wherein the down tube releases steam from the cyclone-type gas expansion vessel into the steam exit and the at least partially lignin-enriched fine particles drop below the steam input and are collected.

31. The improved process of claim 30, wherein the released steam and condensed steam from the reaction vessel is introduced into the cyclone-type gas expansion vessel tangentially.

32. A process for producing a beneficiated solid biomass fuel, comprising:
pressurizing a biomass in a reaction vessel, wherein the reaction vessel comprises an inner perforated screen separating the biomass from a main body of the reaction vessel and with one or more perforated screen fingers disposed within the reaction vessel and positioned within the biomass to increase exposure of the biomass to steam, the one or more perforated screen fingers comprising holes of about 0.3 centimeters to about 0.7 centimeters;
rapidly depressurizing the reaction vessel to disrupt a biomass structure and form disrupted biomass and release biomass salts and light volatile organic compounds entrained within the biomass; and separating salts and light volatile organic compounds from the disrupted biomass to produce a beneficiated biomass having reduced salts and light volatile organic compounds.

33. The process of claim 32, wherein the reaction vessel further comprises at least one offset butterfly valve configured to release steam.

34. The process of claim 33, wherein the offset butterfly valve is configured to release pressure from the reaction vessel in less than about 500 msec.

35. The process of claim 33, wherein the at least one offset butterfly valve configured to release steam comprises two or more offset butterfly valves, the two or more offset butterfly valves having a combined cross section approximately equal to a cross section of the at least one offset butterfly valve.

36. The process of claim 1, wherein the step of pressurizing the prewashed and preheated biomass in an inner perforated screen of a reaction vessel comprises pressurizing the prewashed and preheated biomass in an inner perforated screen comprising one or more perforated screen fingers comprised of a screen having holes of about 0.3 centimeters to about 0.7 centimeters.

37. A process for producing a beneficiated solid biomass fuel, comprising:
- collecting raw biomass in an input hopper;
- prewashing the raw biomass in a prewash container to remove contaminants;
- preheating the raw biomass to weaken cells walls of the raw biomass and initiate breaking of hydrogen bonds, wet oxidation and acid hydrolysis of the biomass;
- pressurizing the prewashed and preheated biomass in a reaction vessel, wherein the reaction vessel comprises an inner perforated screen separating the biomass from the main body of the reaction vessel and with one or more perforated screen fingers disposed within the reaction vessel and positioned within the biomass to increase exposure of the biomass to steam;
- rapidly depressurizing the reaction vessel to disrupt a structure of the biomass and release biomass salts and light volatile organic compounds entrained within the biomass and produce steam containing at least partially lignin-enriched fine particles;
- releasing the steam and condensed steam from the reaction vessel entrained with fine lignin-enriched particles into a cyclone-type gas expansion and gas-release vessel configured to capture the entrained fine lignin-enriched particles from the steam;
- routing the steam from the gas expansion vessel to the input hopper to recapture heat from the captured steam and steam condensate to heat and wet the biomass in the input hopper;
- subjecting the disrupted biomass to a second washing step to remove additional salts and light volatile organic compounds derived from the disrupted biomass;
- mechanically removing a portion of water from the biomass with continuous throughput water removal steps, wherein the resulting biomass comprises less than about 50% water by weight and wherein additional salts and light organic compounds derived from the disrupted biomass are removed with the water;
- mechanically drying through vibratory separation followed by compression in a screw press, wherein the step of mechanical drying through vibratory separation comprises a first separation of biomass using a screen having about 1 mm holes and at least a second separation of biomass using at least one screen having one of: about 100 micron holes and about 39 micron holes; and
- heating the biomass to evaporatively remove an additional portion of the water and produce a friable biomass, wherein the friable biomass comprises less than about 25% water by weight.

* * * * *